LEON J. LOCKWOOD
INVENTOR.

BY Walter Potoroka, Jr.
John P. Moran
ATTORNEYS

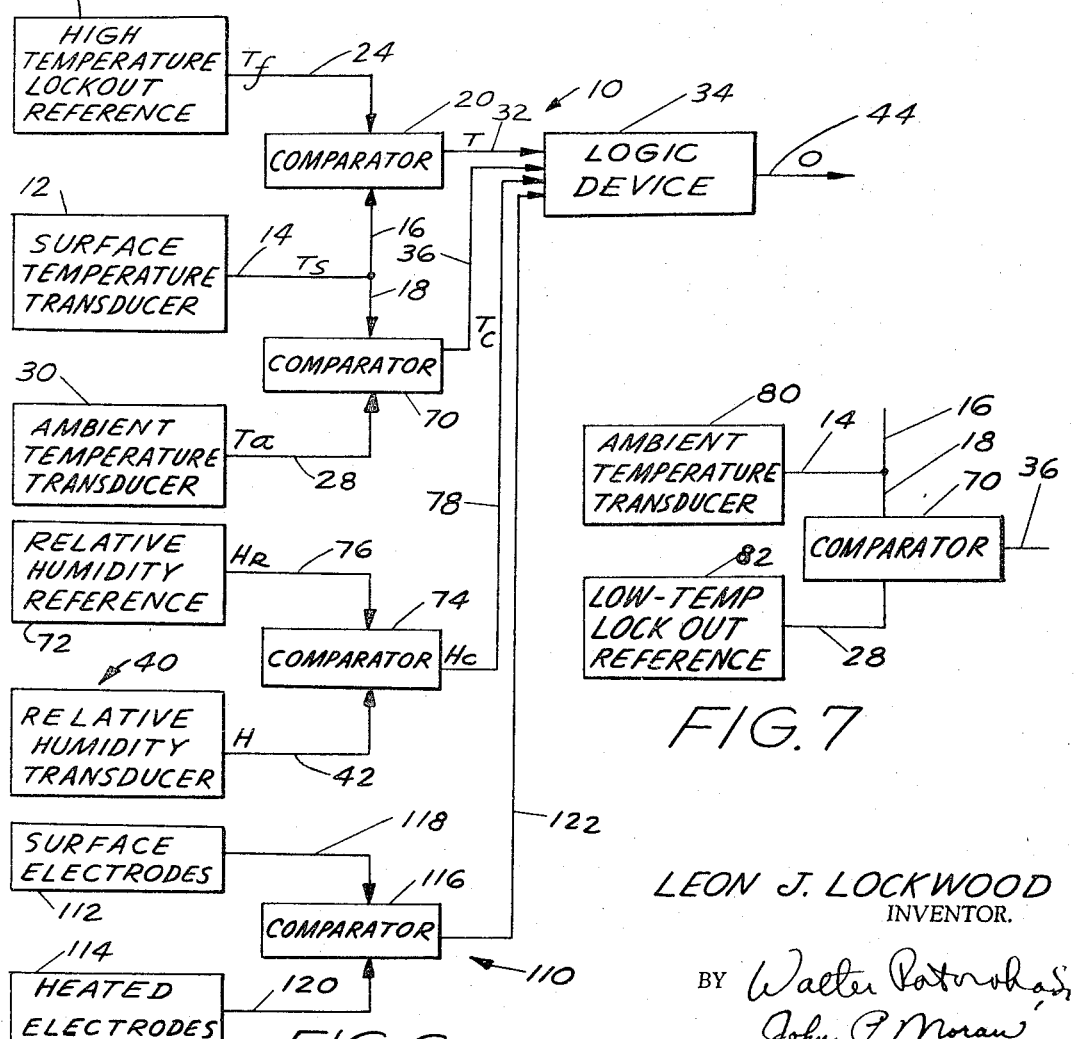

United States Patent Office 3,422,677
Patented Jan. 21, 1969

3,422,677
ICE CONDITION DETECTING DEVICE
Leon J. Lockwood, Southfield, Mich., assignor to Holley Carburetor Company, Warren, Mich., a corporation of Michigan
Filed June 21, 1966, Ser. No. 559,153
U.S. Cl. 73—336.5                               11 Claims
Int. Cl. G01n 25/00

ABSTRACT OF THE DISCLOSURE

A device for anticipating atmospheric conditions likely to result in condensation of water vapor or frost on a surface employs a signal-producing sensors which sense the temperature of the surface, a reference value indicative of freezing temperature, the ambient atmospheric temperature and atmospheric relative humidity. The signals produced in response to the sensed parameters are then, with use of logic means, compared in order to determine if the atmospheric conditions are such as to anticipate either condensation of the water vapor or the formation of frost on the surface.

---

This invention relates generally to atmospheric condition indicating devices, and more particularly to an electronic type device for anticipating a dew point, and a possible icing condition on a particlar surface due to condensation, and, if desired, for additionally detecting the presence of precipitated snow or ice on the selected surface.

In certain situations it is necessary to anticipate and prevent the formation of ice on some particular surface. For example, an undesirable and dangerous situation is created when ice is permitted to form at the air inlet of a gas turbine engine. In other situations, it may be desirable to sense that moisture or frost is about to condense and to actuate a signal which visually indicates that a dangerous condition exists, or to actuate such a signal, for example, when snow or ice is lying on some particular surface, such as on a bridge or other highway location which has been the scene of an alarmingly high number of wintertime accidents.

While snow or ice which occurs as a direct result of precipitation provides its own visual warning, the imminence of ice formation due to condensation at below freezing temperatures is by far the more troublesome because it can occur without warning. However, both conditions can be detected and, as mentioned above, suitable visual signals or heaters may be actuated.

In order to detect a condensation condition, it is necessary to determine the proximity of the surface temperature to the saturation temperature of the atmosphere surrounding the surface, and a number of methods have been used in the past for determining these temperatures. For temperatures above freezing, wet bulb and dry bulb thermometers has been used. Another method has been to measure the saturation temperature directly with a dew point hygrometer and compare it with the surface temperature.

A primary object of the invention is to provide novel means for sensing the above condition, such means including a relative humidity transducer.

In order for a freezing condition to occur as a result of condensation, it is well known that the surface temperature must be below 32° F. and lower than the saturation temperature. Also, as a practical matter, one need not be concerned with temperatures in the lower ranges, say below 0°, since the moisture content of the air at these temperatures is usually not sufficient for the formation of ice. Thus, it is possible to limit the area of concern to a temperature range of 0°–32° F.

Psychometric charts indicate an important relationship between relative humidity and the difference between ambient and surface temperatures. First, it is clear that saturation temperature or dew point, at which condensation occurs, is, for any particular relative humidity less than 100%, always below ambient temperature. Therefore, condensation will not occur on a particular surface unless the temperature of that surface is equal to or below the above mentioned saturation temperature. By using psychometric chart information, a series of points for different saturation temperatures within the practical or critical range, say 30° F., 10° F. and 0° F., can be plotted on a graph of relative humidity vs. temperature differential, wherein the temperature differential is that of ambient temperature less dew point, resulting in curves such as A, B and C of FIGURE 1. Since, as stated above, surface temperature must be at least as low as the dew point or saturation temperature in order for condensation to occur on that surface, the curves A, B and C may be considered to be representative of relative humidity vs. $\Delta T_1$, the latter being ambient temperature less surface temperature, or $T_a - T_s$.

It may be noted that the 30° F., 10° F. and 0° F. curves are relatively close together. Thus, a curve D may be drawn, which closely approximates all curves in the practical range of 0°–32° F. Curve D may be drawn either below the 10° F. or 0° F. curves, or, if desired, between the 30° F. and 10 °F. curves, as illustrated, on the theory or basis that there is relatively little moisture content at the lower temperatures. For any point falling above curve D in the elected range, condensation will occur; for any point falling below the curve D, condensation will not occur. Obviously, since the selected temperatures are below freezing temperature, the condensation would be in the form of frost or ice.

From the FIGURE 1 graph, it is apparent that at a relative humidity of 70%, the temperature differential would have to be approximately 7.5° F. in order for condensation to occur. It is doubtful that such a gradient would ever exist between the temperature of a highway surface, for example, and the ambient temperature, indicating that the limits employed in FIGURE 1 make curve D a practical one and that relative humidities lower than 70% need not be considered.

From the above discussion, it is apparent that two factors are necessary to determine the possibility of condensation, namely, relative humidity and a temperature differential, i.e., the difference between ambient and surface temperature. It should now be apparent that it is not necessary to measure both saturation temperature and surface temperature and make a direct comparison. As will be explained, equipment producing voltage or other signals representative of a freezing temperature reference, surface temperature, ambient temperature, and relative humidity may be utilized to determine the possibility of icing due to condensation.

For certain applications, such as the highway application referred to above, it is necessary to be concerned about the possibility of ice formation as a result of precipitation, which may occur at times when the relative humidity of the air at the surface is quite low and condensation could not possibly occur. Thus, the practical ice detecting system would include provisions for detecting the presence of ice resulting from any precipitation which might occur at below freezing temperatures, or any remanent precipitation which might have occurred previously under any conditions.

Such precipitation can be detected, for example, by measuring the electrical resistance of water, as compared to the resistance of ice, water having low resistance while ice has high resistance. A pair of electrode units, the details of which will be described later, may be used for this purpose, both of which may be imbedded directly into the road surface or adjacent thereto, with the electrodes being exposed to road conditions so as to be capable of providing an indication of the exact road surface conditions. More specifically, one of the electrode units may include a heating element which maintains the area in the vicinity of its exposed end at a temperature above freezing. So long as free water, such as rain, lies upon both sets of electrodes, the corresponding resistance will be low for both. Should the surface temperature fall below freezing during or after the precipitation period, obviously ice would form on top of the unheated electrode unit, while water would remain above the heated electrode unit. The corresponding relative low and high resistances may, of course, be used to produce a signal indicating surface ice, regardless of what may be happening by way of condensation. It is apparent, however, that the signal may result from either condition, i.e., condensation in the range of 0°–32° F. or precipitation at any temperature below 32° F.

Accordingly, a general object of the invention is to provide a system which anticipates an atmospheric saturation condition which would result in the formation of frost on a particular surface, and which further detects the presence of snow, or of ice which forms as a result of free water being on said surface while the surface is at or below freezing temperature.

Another object of the invention is to provide such a system which utilizes a novel approach to the detection of the atmospheric saturation condition, without having to measure such a condition directly.

A further object of the invention is to provide such a system which may be used solely for anticipating ice due to condensation at a freezing temperature dew point, or which may also include means for detecting the presence of ice resulting from precipitation or free water at freezing temperatures.

A more specific object of the invention is to provide such a system wherein a signal representative of surface temperature is compared both with a reference signal representative of a freezing temperature and with a signal representative of ambient temperature, a signal representative of relative humidity is compared with a signal representative of the difference between the surface and ambient temperatures and an output signal indicative of condensation conditions may actuate an appropriate device in the event a freezing surface temperature is present.

A further object of the invention is to provide such a system which may be modified to compare the signal representative of relative humidity with a signal representative of a particular predetermined relative humidity.

A still further object of the invention is to provide such a system which may be modified to substitute an ambient temperature transducer for the surface temperature transducer, the former being compared to signals representative of predetermined high and low temperature references, for those applications wherein the surface and ambient temperatures are known to maintain a constant differential.

These and other objects and advantages of the invention will become more apparent when reference is made to the following specification and the accompanying drawings wherein:

FIGURES 4 and 5 are enlarged cross-sectional views of other elements of the device shown by FIGURE 2;

FIGURE 6 is a schematic illustration of a modification of the invention;

FIGURE 7 is a schematic illustration of a modification of a portion of FIGURE 6.

Figure 2:
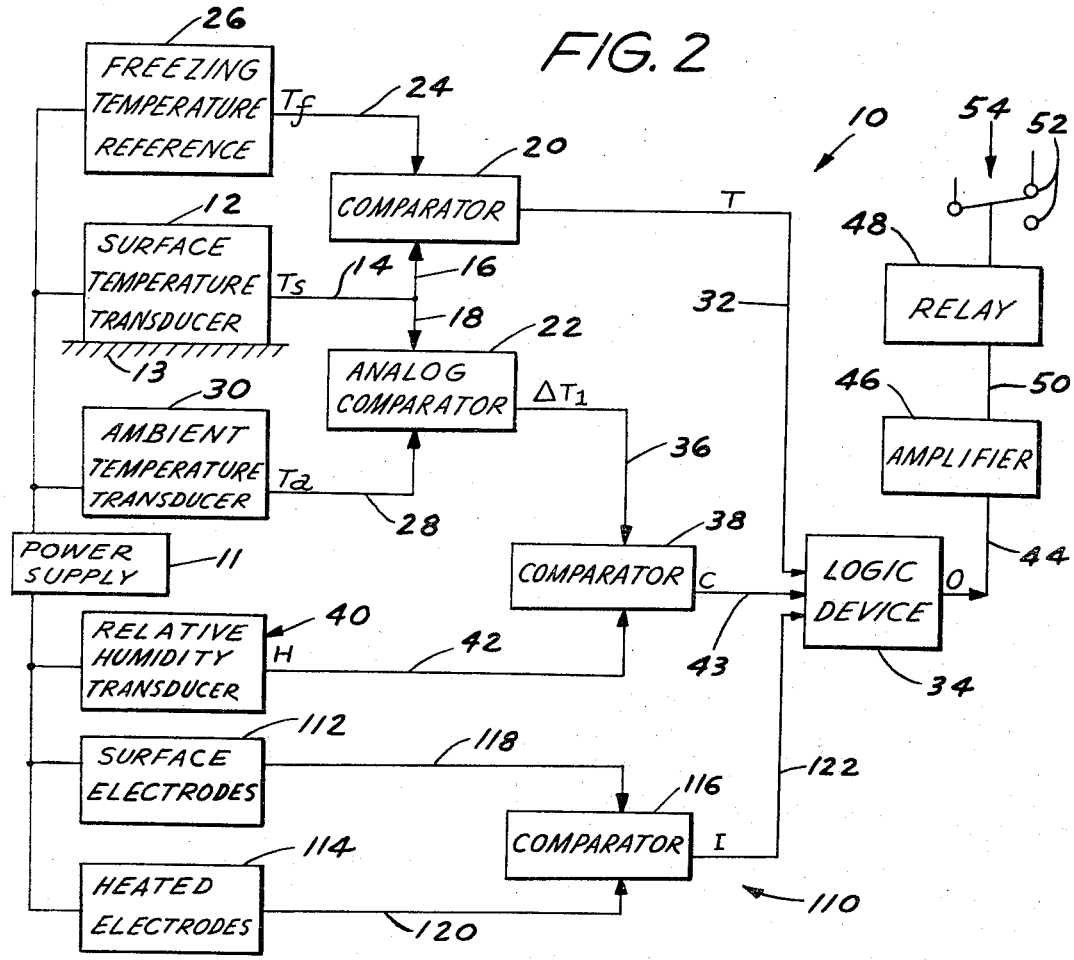
FIGURE 2 is a schematic illustration of a device embodying the invention.

Referring now to the drawings in greater detail, FIGURE 2 illustrates schematically the proposed condensation and ice prevention system 10. The particular system 10 shown comprises a source of power 11, three sensing elements, three differential amplifiers or comparators and an output system for detecting condensation conditions, as well as two sensing elements and one comparator for detecting ice due to precipitation.

More specifically, the system 10 includes a suitable surface temperature sensing transducer or thermistor 12, which may comprise a variable resistor, or the like, having an output line 14. The thermistor 12 senses the temperature of a surface represented generally as 13, whereon ice would normally form, but whereon it is desired that ice not be permitted to form. Lines 16 and 18 connect the output line 14 to digital and analog differential amplifier comparators 20 and 22, respectively, thereby communicating the voltage output $T_s$, representative of surface temperature, from the thermistor 12 to both the differential amplifiers. A voltage $T_f$ is communicated to the comparator 20 via a line 24 from a high-temperature-lockout or freezing temperature reference device 26, such as a voltage divider, and a voltage $T_a$ is directed to the comparator 22 via a line 28 from a suitable ambient temperature sensing transducer or thermistor 30, such as a second variable resistor.

Figure 1:
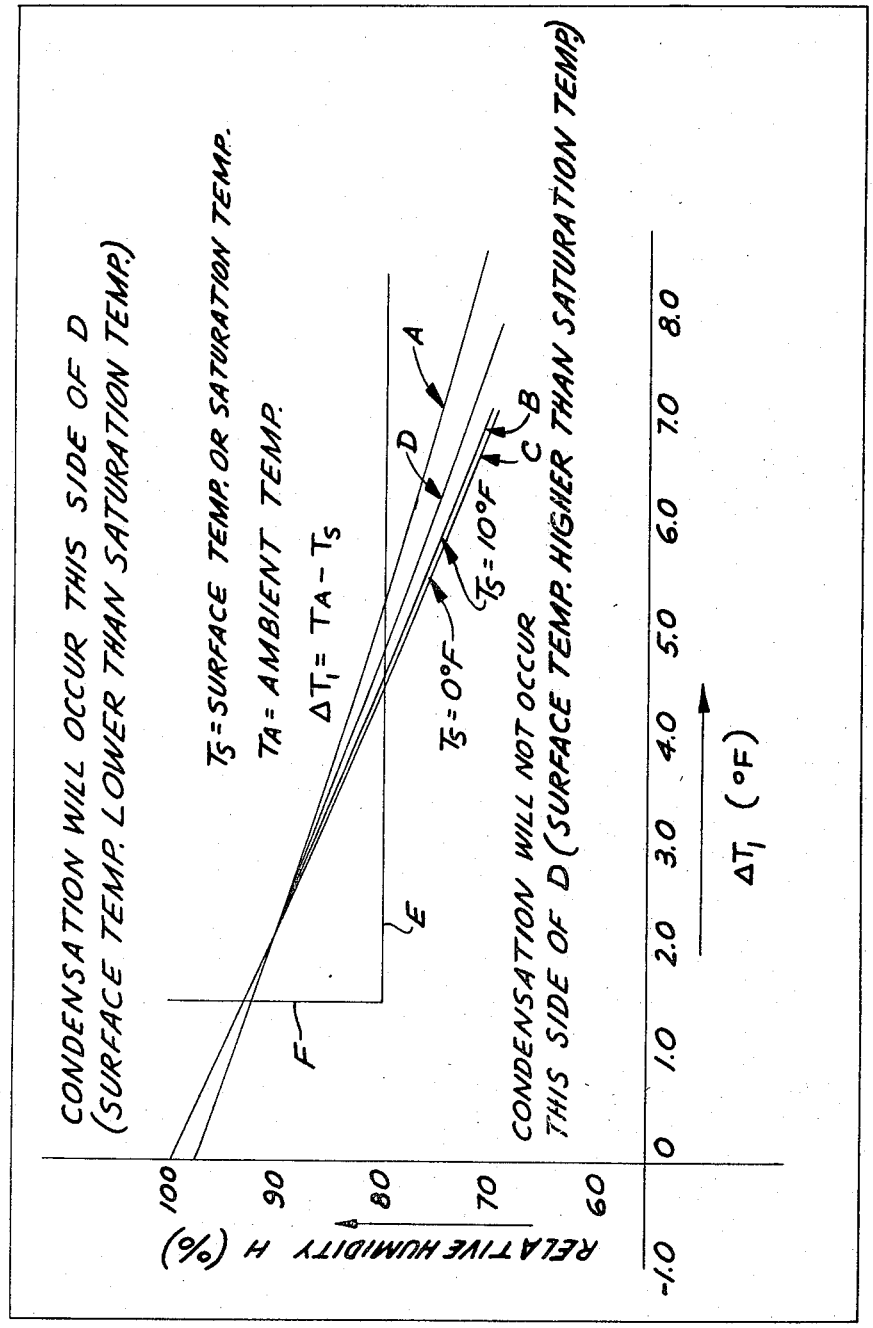
FIGURE 1 is a graphical representation of the theory on which the invention is believed to be based.

The differential amplifier 20 compares voltages $T_s$ and $T_f$ while the differential amplifier 22 compares voltages $T_s$ and $T_a$. The resultant output signal T, generated by the comparator 20 along a line 32 leading to a logic device 34, will indicate which temperature is lower. A voltage signal $\Delta T_1$, representative of the temperature differential $T_a - T_s$, will be transmitted from the analog comparator 22 along a line 36 to a comparator 38, to which a voltage signal H will have been transmitted from a relative humidity transducer 40 (which will be described later in detail) along a line 42. The relationship between the two signals H and $\Delta T_1$ is such that, for each voltage signal H representative of a particular relative humidity, a comparison will be made in the comparator 38 with the voltage signal $\Delta T_1$, causing the output C to indicate whether the result is within the region above or below curve D of FIGURE 1.

For purposes of clarification, if 5.5 volts from the transducer 40 represented 75% relative humidity and 5.5 volts from the comparator 22 represented 5.5° F. differential, 6 volts from comparator 22 would indicate that condensation could occur, whereas a 5 volt signal from comparator 22 would indicate that condensation could not occur. Accordingly, the logic device 34 which receives the signals C and T via the line 43 and 32, respectively, will, in turn, supply an output O through a line 44 to any suitable mechanism, such as an amplifier 46, and thence into a relay 48 via a line 50, thereby either opening or closing contacts 52 of the relay 48, depending upon the type of logic employed in the device 34. The contacts 52 may be a part of a switch 54 controlling a source of heat or a warning signal, both of which are represented by 55.

Figure 3:
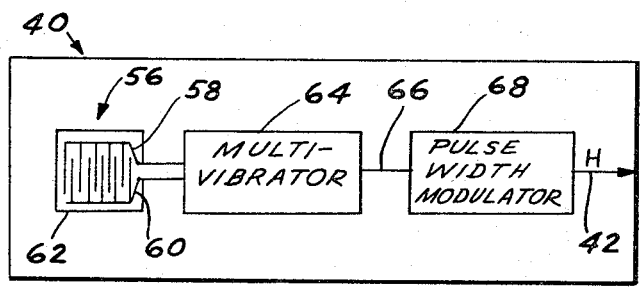
FIGURE 3 is a schematic illustration of one of the components of the device shown by FIGURE 2.

A particular electrical system which is satisfactory for the sensor 40 is illustrated in FIGURE 3, it being understood that this system is representative and not the only possible arrangement for the sensor 40.

System 40 illustrated in FIGURE 3 comprises a relative humidity sensing element 56, which may consist of a pair of conductors 58 and 60 formed in intermingled comb-shapes on a printed circuit board 62, the gaps between fingers of the two conductors being held constant. The assembled board is coated with a mixture consisting of a suitable polyvinyl alcohol mixture. In this instance, the humidity sensing element 56 has an electrical impedance which varies when the element is responding to relative humidities. This impedance is converted to an electrical signal, representative of relative humidity by any suitable means, such as the timing element of a one-shot or monostable multivibrator 64.

A train of pulses from the multivibrator 64 is fed via a lead 66 into a modulator 68 which amplifies and inverts the D.C. component of the pulse train. The resultant output voltage, referred to above as H, of the modulator 68 is transmitted to the amplifier 38 wherein it is compared to the reference voltage $\Delta T_1$ supplied by the comparator 22, as mentioned above.

The specific structure of the differential amplifier comparators 20 and 38 of FIGURE 2 may consist of any suitable switching arrangement, many different techniques being well known in the art, one specific technique being to include a pair of transistors (not shown) in each comparator connected in a conventional differential amplifier arrangement, and feeding the voltage $T_f$ to the base of one transistor and the voltage $T_a$ to the base of the other transistor. Actually, suitable circuitry for the above components may be found in various electrical textbooks and handbooks, such as Transistor Circuit Design, published by McGraw-Hill Book Company in 1963.

Referring once again to FIGURE 2, an ice detector system 110 may supplement the above described system 10, in order to actuate the switch 52 should ice be present on a particular surface as a result of precipitation combined with below freezing temperatures, as discussed above. The system 110 includes a pair of unheated surface electrodes 112 and a pair of heated electrodes 114, these pairs of electrodes being connected to a comparator 116 via leads 118 and 120, respectively. The electrodes are such that, in the event free-water or air is adjacent both the electrodes 112 and 114, the resistance of both would be the same and no voltage differential would be observed by the comparator 116. However, should ice form on top of the electrodes 112, the resistance would be high as compared to that of the electrodes 114, and the voltage differential, as observed by the comparator 116, would result in a signal I being sent via a line 122 to the logic device 34, whose output O controls the actuation of the switch 52, as previously mentioned.

It should be noted at this point that the logic device 34 could be designed such that it would not produce an output which would actuate the switch 54 or other device, even if the signal I were indicative of a difference in resistance, as mentioned above, so long as the signal T from the comparator 20 is indicating that surface temperature is greater than freezing temperature. This is important because there would be a possibility that a puddle or pool of water could form on top of the heated electrodes 114 while the top of the unheated surface electrodes 112 is exposed to air. Such as combination would indicate a difference in resistance, insofar as the comparator 116 is concerned, and, hence, would produce a signal I in the same manner as if ice had formed on the top of the electrodes 112, unless prevented from doing so until the signal T indicates a lower-than-freezing surface temperature, thereby enhancing the probability that it is ice which is formed on the electrodes 112, rather than air.

It should also be obvious that, should the highway be salted at any time, causing ice on the electrodes 112 to melt, the resultant actuation of the switch 54 would, for example, turn off any visual signal which had been indicating "ice ahead."

While a variety of electrode designs would be suitable for the elements 112 and 114, a pair of suitable devices are illustrated in FIGURES 4 and 5.

FIGURE 4 is typical of the unheated electrode unit 112, while FIGURE 5 is typical of a suitable heated electrode unit 114. The unit 112 may include a cylindrical metal housing 124 having a two-diameter central opening therethrough, the larger and smaller openings being represented as 126 and 128, respectively. A plastic insert 130 is mounted in the larger diameter portion 126 thereof and a cup shaped metal member 132, whose outer diameter is smaller than the larger inner diameter of the cylindrical housing 124 is mounted within the portion 126 with its open end on the plastic member. The members 124 and 132 serve as the electrodes, separated by a suitable potting material 134, which is inserted as a cylindrical spacer therebetween. Wire leads 136 and 138 extend from openings 140 and 142 formed in the cup shaped member 132 and the cylindrical member 124, respectively, through the smaller internal diameter portion 128.

A surface temperature sensing thermistor 144 may be mounted within the cup shaped member 132 in order that the temperature of the surface in which the unit 112 is imbedded may be determined. The thermistor 144, in this case, would serve the same purpose as, and in place of, the surface temperature transducer 12 of FIGURE 2. Leads 146 extending from thermistor 144 through the smaller diameter portion 128 would be comparable to the line 14 of FIGURE 2.

The unit 114 is similar to the unit 112, all like parts bearing the same reference numerals, but includes additionally, a plurality of resistors 148 mounted within the cup shaped member 132 in place of the thermistor 144, the resistors 148 serving as a heating element for heating the surface adjacent the upper end 150 of the unit 114. If four resistors 148 are used in parallel, should one or two of the resistors fail for any reason, the heat from the remaining three or two resistors would be sufficient to melt any ice which might tend to form on the end 150, for ambient temperatures below 32° F.

The operation of both the electrode units 112 and 114 are as described above.

Inasmuch as the differential amplifier comparator 22 of FIGURE 2 must be capable of transmitting a voltage signal which is representative of a variable difference between two temperatures, it is necessarily an analog type and, hence, a relatively complicated device. However, such a device is essential if the accuracy required is such that it is necessary or desirable to provide a signal for any condition which may fall above the curve D in FIGURE 1, curve D very closely simulating actual condensation conditions, as discussed above.

In particular applications, however, it may not be necessary to incorporate the accuracy represented by curve D. For example, the application may be such that using a particular relative humidity, say 80%, is sufficient. In other words, it may arbitrarily be determined that condensation is likely to occur only if the relative humidity is above 80%, all other conditions being met. It may, for example, also be determined that ice due to condensation will not occur so long as the difference between ambient temperature and surface temperature is less than a predetermined amount, say 1½° F. The area bounded by these arbitrary parameters is represented above line E and to the right of line F of FIGURE 1.

For a system which will be satisfactory for such an application, refer now to the modification shown by FIGURE 6. This modification includes the same high temperature lock-out reference 26, surface temperature transducer 12, ambient temperature transducer 30, relative humidity transducer 40, comparator 20, and logic device 34 as does the system illustrated in FIGURE 2. However, the comparator 70 is substituted for the comparator 22 of FIGURE 2, the comparator 70 being a digital type and, hence, a much less complicated mechanism than the analog comparator 22, since the resultant signal $T_c$ flowing to the logic device 34 need only indicate whether $T_a$ is greater than or less than $T_s$, plus the 1½° F. just mentioned. If greater, the condition would be that existing to the right of line F of FIGURE 1; if less, to the left of F.

Additionally, FIGURE 6 includes a relative humidity reference device 72. The signal H from the relative humidity transducer 40 is fed via the line 42 to a comparator 74, while a signal $H_R$ is fed via a line 76 from the reference device 72 to the comparator 74. Voltages $T_s$ and $T_f$ are then compared in the comparator 20 which will transmit a signal T along the line 32 to the logic device 34, as was the case in FIGURE 2. Also, a signal $H_c$ will be transmitted from the comparator 74 to the logic device 34 via a line 78, this signal indicating whether H or $H_R$ is the greater.

The output O from the device 34 will serve the same purpose as discussed above relative to the output O of FIGURE 2. In other words, it will indicate either that all conditions are "right" for frost or that one or more of the T, $T_c$ and $H_c$ conditions is "wrong" for frost, depending upon the type of logic involved, and may be used to actuate some mechanism, such as the switch 54 of FIGURE 2, accordingly.

In some applications, it may be desirable to replace the surface temperature sensing element 12 of FIGURE 6 with an ambient temperature sensor 80, illustrated in FIGURE 7, and the ambient temperature sensing element 30 with a low-temperature-lockout reference 82. Such an arrangement is desirable where it is known or assumed that a constant temperature differential exists between ambient and surface temperatures. Hence, in such cases, surface temperature need not be compared with ambient temperature and, in lieu thereof, ambient temperature may be compared with the low temperature reference signal from the sensor 82 and, if ambient temperature is higher than the reference temperature, a signal from the comparator 70 will be generated along the lead 36 to the logic device 34 (FIGURE 6), which will function as previously described.

In other words, the theory behind using the modified FIGURE 7 structure is that ice is apt to form on a surface only while ambient temperature is within a certain temperature range, the limits being set by reference elements 82 and 26, provided, of course, that the application is such that surface temperature will remain a constant amount lower than ambient. Once the predetermined low temperature is reached, the moisture content of the air is considered to be such that it will not be adequate for the condensation of frost or ice.

It may be realized that the apparatus just described relative to FIGURES 6 and 7 will prevent the formation of ice due to condensation resulting from particular combinations of surface temperature, ambient temperature, and relative humidity. However, it is still possible for the combination of free-water, such as rain or other moisture, and a surface temperature below freezing to produce ice on a surface, such as a highway pavement, for example. Thus, in order to anticipate or prevent ice formation from all causes, it is necessary at times to supplement the FIGURE 6 and FIGURE 7 embodiments with a system which will warn as to the existence of ice, should precipitation and below-freezing-temperatures be present. Thus, the system 110 may be employed with either the FIGURE 6 or FIGURE 7 structures, the cooperation being illustrated in FIGURE 6.

It should be apparent that the invention represents a novel approach to the theory of operation of devices for anticipating atmospheric conditions which are likely to result in frost on a surface, as well as novel means for actually sensing and comparing particular parameters for anticipating these conditions. Also, it is apparent that such means may be supplemented with additional means for detecting the presence of ice due to free-water conditions, such as rain, sleet, snow, etc.

While but three embodiments of the invention have been shown and described, it is apparent that other modifications are possible within the scope of the invention.

I claim:

1. A device for either anticipating condensation of moisture on a surface or signalling the presence of free-water when the temperature of said surface is below a predetermined value, said device comprising a source of electricity, first means for creating a first output signal indicative of the difference between the temperature of said surface and ambient temperature, second means responsive to atmospheric moisture vapor for creating a second output signal indicative of relative humidity, third means responsive to and effective for comparing said second signal indicative of relative humidity to said first output signal indicative of the difference between the temperature of said surface and said ambient temperature in order to produce a first resultant signal when condensation is about to occur on said surface, and fourth means including means responsive to free-water for creating a second resultant signal when said temperature of said surface is below a predetermined value.

2. A device for either anticipating condensation of moisture on a surface or signalling the presence of free-water when the temperature of said surface is below a predetermined value, said device comprising a source of electricity, first means for creating a first output signal indicative of the temperature of said surface, second means responsive to and effective for creating a second output signal indicative of ambient atmospheric temperature, third means responsive to atmospheric moisture vapor for creating a third output signal indicative of relative humidity, fourth means for comparing said third output signal indicative of relative humidity with a signal indicative of the difference between said first output signal and said second output signal and in accordance therewith creating a first resultant signal when condensation is about to occur on said surface, and fifth means including means responsive to free-water for creating a second resultant signal when said temperature of said surface is below a predetermined value.

3. A device for anticipating atmospheric conditions likely to result in condensation of water vapor or frost on a surface, said device comprising first means for comparing the temperature of said surface with a reference signal indicative of freezing temperature and creating in accordance therewith a first rescultant output signal indicating that a predetermined relationship between said surface temperature and said reference signal has at least been attained, second means for comparing said temperature of said surface with the temperature of ambient atmosphere and creating a second resultant output signal representative of the temperature difference therebetween, third means responsive to relative humidity of said ambient atmosphere and effective for comparing said relative humidity with said second resultant output signal representative of said temperature difference and creating in accordance therewith a third resultant output signal indicating that a predetermined relationship between said relative humidity and said temperature difference has at least been attained, and control means for receiving said first resultant output signal and said third resultant output signal and creating in accordance therewith an output indicating that condensation of water vapor or frost formation on said surface are anticipated.

4. A device for anticipating atmospheric conditions likely to result in condensation of water vapor or frost on a surface, said device comprising first means for comparing the temperature of said surface with a first predetermined reference temperature and creating a first output signal whenever a predetermined relationship has been attained between said surface temperature and said first reference temperature, second means for comparing the temperature of said surface with the temperature of ambient atmosphere and creating a second output signal whenever a predetermined relationship has been attained between said surface temperature and said ambient temperature, third means for comparing ambient atmospheric relative humidity with a reference signal indicative of a predetermined value of relative humidity and creating a third output signal whenever a predetermined relationship has been attained between said ambient atmospheric relative humidity and said predetermined value of relative humidity, and fourth means effective for receiving any of said output signals and further being effective to produce a suitable fourth output signal which is indicative of the fact that atmospheric conditions are such that condensation of water vapor or frost formation on said surface are anticipated whenever said first, second and third output signals are being simultaneously received by said fourth means.

5. The device described in claim 4, including additional means associated with said fourth means for positioning a switch to one position should said fourth means simultaneously receive less than all of said first, second and third output signals and said additional means being further effective for positioning said switch to a second position should said fourth means be simultaneously receiving each of said first, second and third output signals.

6. The device described in claim 4, wherein said fourth means is a nor-gate.

7. The device described in claim 5, including additional means for detecting the presence of ice and actuating said switch so long as said ice is present.

8. A device for anticipating atmospheric conditions likely to result in condensation of water vapor or frost on a surface, said device comprising means for comparing ambient temperature with predetermined high and low reference temperatures, means for comparing relative humidity with a predetermined relative humidity reference, and means for actuating an output switch should there be a signal supplied by any one of said first two mentioned means.

9. A method of anticipating conditions likely to result in a condensation of water vapor or frost on a surface, said method comprising the following steps:
   (a) sensing the surface temperature of a particular surface and supplying a signal representative thereof,
   (b) sensing ambient temperature and supplying a signal representative thereof;
   (c) supplying a signal representative of freezing temperature;
   (d) comparing the signal representative of freezing temperature with the signal representative of surface temperature, and providing a signal indicating whether the surface temperature is higher or lower than freezing temperature;
   (e) comparing the signal representative of surface temperature with the signal representative of ambient temperature, and providing a signal indicative of the difference between ambient temperature and surface temperature;
   (f) sensing relative humidity and supplying a signal representative thereof;
   (g) comparing the relative humidity signal with the signal indicative of the difference between ambient temperature and surface temperature, and providing a signal indicating whether the value of the relative humidity signal is greater than or less than the value of the temperature differential signal; and
   (h) using logic means for producing an output indicating when said surface temperature is lower than freezing temperature and the value of the relative humidity signal is greater than the value of the temperature difference signal.

10. The process described in claim 9 including, additionally, the following steps:
   (a) sensing the presence of free-water on said surface and
   (b) providing a signal whenever said free-water freezes.

11. A device for anticipating atmospheric conditions likely to result in condensation of water vapor or frost on a surface, said device comprising means for comparing ambient atmosphere with predetermined high and low reference temperatures, means for comparing relative humidity with a predetermined relative humidity reference, and means for actuating an output device should there be a signal supplied by any one of said first two mentioned means.

References Cited

UNITED STATES PATENTS

| | | | |
|---|---|---|---|
| 3,229,271 | 1/1966 | Frant | 340—235 |
| 3,284,003 | 11/1966 | Ciemochowski. | |
| 3,287,974 | 11/1966 | Ciemochowski | 73—336.5 |
| 3,305,851 | 2/1967 | Brandtszteter | 340—234 |

FOREIGN PATENTS 999,118  7/1965  Great Britain.

LOUIS R. PRINCE, *Primary Examiner.*

D. E. CORR, *Assistant Examiner.*